(12) United States Patent
Wu et al.

(10) Patent No.: US 10,534,476 B2
(45) Date of Patent: Jan. 14, 2020

(54) COMPENSATION METHOD FOR AN INDUCED AMOUNT IN A TOUCH SENSOR AND TOUCH PANEL THEREOF

(71) Applicant: PIXART IMAGING INC., Hsin-chu (TW)

(72) Inventors: Sung-Han Wu, Hsin-chu (TW); Ming-Hung Tsai, Hsin-chu (TW); Che-Chia Hsu, Hsin-chu (TW)

(73) Assignee: PIXART IMAGING INC., Hsin-chu (TW)

( * ) Notice: Subject to any disclaimer, the term of this patent is extended or adjusted under 35 U.S.C. 154(b) by 204 days.

(21) Appl. No.: 15/718,023

(22) Filed: Sep. 28, 2017

(65) Prior Publication Data

US 2018/0321792 A1   Nov. 8, 2018

(30) Foreign Application Priority Data

May 5, 2017   (TW) .............................. 106115020 A (51) Int. Cl.
*G06F 3/041*   (2006.01)
*G06F 3/047*   (2006.01)
*G06F 3/044*   (2006.01)

(52) U.S. Cl.
CPC ............ *G06F 3/0418* (2013.01); *G06F 3/044* (2013.01); *G06F 3/047* (2013.01); *G06F 2203/04111* (2013.01)

(58) Field of Classification Search
CPC ......... G06F 2203/04111; G06F 3/0418; G06F 3/044; G06F 3/047
See application file for complete search history.

(56) References Cited

U.S. PATENT DOCUMENTS

| | | | |
|---|---|---|---|
| 2011/0006832 A1* | 1/2011 | Land .................. | G06F 3/044 327/517 |
| 2011/0109585 A1* | 5/2011 | Kwon ................. | G06F 3/0418 345/174 |
| 2011/0163992 A1* | 7/2011 | Cordeiro ............. | G06F 3/0416 345/174 |
| 2012/0050180 A1* | 3/2012 | King .................. | G06F 3/0416 345/173 |
| 2013/0069905 A1* | 3/2013 | Krah .................. | G06F 3/044 345/174 |
| 2013/0176277 A1* | 7/2013 | Wang ................. | G06F 3/044 345/174 |
| 2014/0267129 A1* | 9/2014 | Rebeschi ............ | G06F 3/0418 345/174 |

\* cited by examiner

*Primary Examiner* — Viet D Pham
(74) *Attorney, Agent, or Firm* — Li & Cai Intellectual Property (USA) Office (57) ABSTRACT

A compensation method for an induced amount in a touch sensor and a touch panel thereof are provided. The compensation method uses a fake finger circuit to simulate the situations when a user touches the sensing nodes of the touch sensor with a finger, and obtains the gain coefficient of each of the sensing nodes, which are used to compensate for the induced capacitance generated by the sensing nodes as a result of being touched by an external object. In this way, the extra effects caused by the difference in basic capacitance can be eliminated by the gain coefficient.

18 Claims, 7 Drawing Sheets

COMPENSATION METHOD FOR AN INDUCED AMOUNT IN A TOUCH SENSOR AND TOUCH PANEL THEREOF

BACKGROUND OF THE INVENTION

1. Field of the Invention

The present disclosure relates to a compensation method for an induced amount in a touch sensor and a touch panel thereof; more particularly, to a compensation method for an induced amount in a touch sensor and the touch panel thereof which use a fake finger circuit to simulate the capacitance variation on each sensing node when a user touches the sensing nodes on the touch sensor with finger.

2. Description of Related Art

Touch panels have been widely used in various kinds of electronic appliances. For example, a touch panel can be combined with a display panel to form a touchscreen. In general, a touch panel includes a touch sensor and a touch controller, in which the touch sensor is usually a two-dimensional capacitive touch sensor that includes a plurality of sensing lines arranged in parallel to a first direction, and a plurality of driving lines arranged in parallel to a second direction that is perpendicular to the first direction. Accordingly, the sensing lines intersect the driving lines to form a plurality of sensing nodes. It should be noted that the first direction and the second direction are often illustrated as the X-direction and the Y-direction.

If an external object, e.g. the finger of a user, touches one of the sensing nodes and an induced capacitance of the sensing nodes forms accordingly, the induced capacitance of the sensing node is proportional to ($\Delta Cm/Cm$), in which $Cm$ represents the basic capacitance of the sensing node, i.e. the induced capacitance that exists in the sensing node before the sensing node is touched by an external object, and $\Delta Cm$ represents the capacitance variation caused by the touch of the external object. The basic capacitance of each sensing node differs due to manufacturing defects, which causes differences in induced capacitance between sensing nodes when the sensing nodes are touched by objects. The aforementioned differences in induced capacitance often result in incorrect calculations when the touch controller tries to determine the touch positions.

SUMMARY OF THE INVENTION

One embodiment of the present disclosure provides a compensation method for an induced amount in a touch sensor. The compensation method is performed on a touch controller. The touch sensor includes a plurality of sensing lines arranged parallel to a first direction and a plurality of driving lines arranged parallel to a second direction, in which the plurality of the sensing lines intersect the plurality of driving lines to form a plurality of sensing nodes. The touch controller is electrically connected to the plurality of sensing lines and the plurality of driving lines so as to transmit a driving signal to the plurality of driving lines and receive an induced capacitance in relation to each of the plurality of sensing nodes from the plurality of sensing lines. The compensation method for an induced amount includes the following steps: obtaining a capacitance variation in relation to each of the sensing nodes through at least one predetermined circuit; obtaining a gain coefficient in relation to each of the sensing nodes according to the capacitance variation of each of the sensing nodes and the at least one predetermined circuit; and compensating for the induced capacitance of each of the sensing nodes using the gain coefficient of the sensing node when the sensing node generates the induced capacitance in response to a touch from an external object.

Another embodiment of the present disclosure provides a touch panel. The touch panel includes a touch sensor and a touch controller. The touch sensor includes a plurality of sensing lines arranged parallel to a first direction and a plurality of driving lines arranged parallel to a second direction, in which the plurality of the sensing lines intersect the plurality of driving lines to form a plurality of sensing nodes. The touch controller is electrically connected to the plurality of sensing lines and the plurality of driving lines so as to transmit a driving signal to the plurality of driving lines and receive an induced capacitance in relation to each of the plurality of sensing nodes from the plurality of sensing lines. The touch controller obtains a capacitance variation in relation to each of the sensing nodes through at least one predetermined circuit, and a gain coefficient in relation to each of the sensing nodes according to the capacitance variation of each of the sensing nodes and the at least one predetermined circuit. Furthermore, the touch controller compensates for the induced capacitance of each of the sensing nodes using the gain coefficient of the sensing node when the sensing node generates the induced capacitance in response to a touch from an external object.

The predetermined circuit is preferably a fake finger circuit, which is coupled to the driving line and the sensing line of each of the sensing nodes in a sequential order so that the touch controller obtains the induced capacitance generated by each of the sensing nodes as a result of being coupled to the fake finger circuit.

The fake finger circuit preferably includes a first capacitor a second capacitor and an electrical assembly. A first terminal of the first capacitor is coupled to the plurality of driving lines in a sequential order. A first terminal of the second capacitor is coupled to the second terminal of the first capacitor, and a second terminal of the second capacitor is coupled to the plurality of sensing lines in a sequential order. A first terminal of the electrical assembly is coupled between the second terminal of the first capacitor and the first terminal of the second capacitor, and a second terminal of the electrical assembly is coupled to a ground voltage. The electrical assembly is formed of at least one passive component.

Preferably, the touch controller performs the following steps so as to obtain the capacitance variation in relation to each of the sensing nodes: for each of the sensing nodes, when the fake finger circuit is coupled to the driving line and the sensing line of the sensing node, the touch controller transmits the driving signal to the driving line of the sensing node such that the sensing line of the sensing node is induced to generate the induced capacitance; obtaining the capacitance variation in relation to each of the sensing nodes according to the ratio of the induced capacitance to a basic capacitance, in which the induced capacitance is generated as the result of the sensing node being coupled to the fake finger circuit, and the basic capacitance exists in the sensing node before the sensing node is touched by an external object.

Preferably, the touch controller obtains a measured value of each of the sensing nodes according to the induced capacitance generated by the sensing node as a result of being coupled to the fake finger circuit, and adjusts a measurement threshold value of the touch controller according to the measured value of each of the sensing nodes, in which the measurement threshold value is for determining if the touch controller is touched.

In order to further the understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

Figure 1:
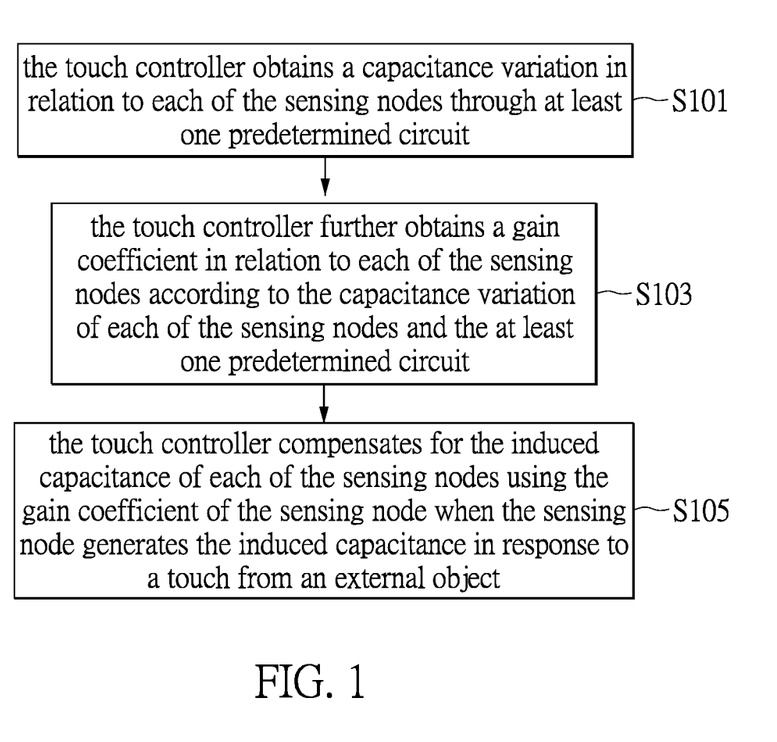
FIG. 1 is a flow chart illustrating a compensation method for an induced amount in a touch sensor provided by one embodiment of the present disclosure.
Figure 2:
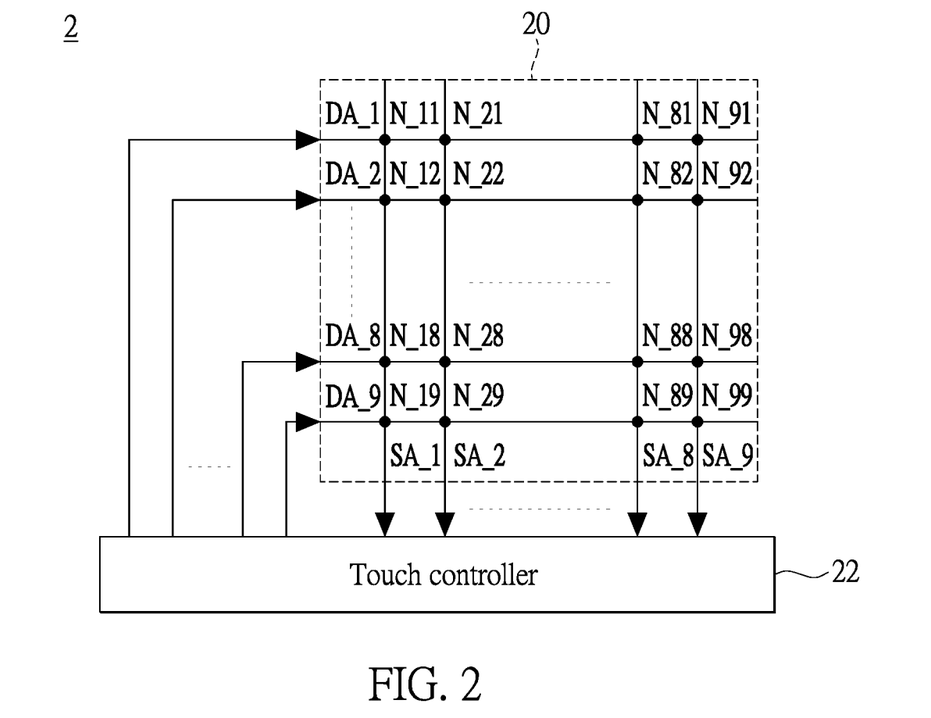
FIG. 2 is functional block diagram of a touch panel provided by one embodiment of the present disclosure.

With reference to FIGS. 1 and 2, in which FIG. 1 is a flow chart illustrating a compensation method for an induced amount in a touch sensor provided by one embodiment of the present disclosure and FIG. 2 is functional block diagram of a touch panel provided by one embodiment of the present disclosure, the compensation method for an induced amount in a touch sensor that can be performed on the touch controller 22 of FIG. 2. However, the present disclosure is not limited thereto. Furthermore, the touch panel 2 of FIG. 2 is only a way of implementing the compensation method for an induced amount in a touch sensor and is not deemed as limiting the scope of the present disclosure.

Referring to FIG. 2, the touch panel 2 includes a touch sensor 20 and a touch controller 22. The touch sensor 20 includes a plurality of sensing lines $SA\_\sim SA\_M$ arranged parallel to a first direction and a plurality of driving lines $DA\_1\sim DA\_N$ arranged parallel to a second direction. The first direction and the second direction are perpendicular to each other. Accordingly, the plurality of sensing lines $SA\_1\sim S\_M$ intersect the plurality of driving lines $DA\_1\text{---}DA\_N$ to form a plurality of sensing nodes $N\_11\sim N\_MN$. To facilitate the description of the present disclosure, the first direction and the second direction will be referred to as the X direction and the Y direction respectively hereinafter. In addition, the number of the sensing lines $SA\_\sim SA\_M$ and the number of the driving lines $DA\_1\sim DA\_N$ are both nine, i.e. M and N both equal nine and the $N\_11\sim N\_MN$ is $N\_11\sim N\_99$. However, the present disclosure is not limited thereto.

The touch controller 22 is electrically connected to the plurality of sensing lines $SA\_1\sim SA\_9$ and the plurality of driving lines $DA\_1\sim DA\_9$ so as to transmit a driving signal (not shown in the drawings) to the plurality of driving lines $DA\_1\sim DA\_9$ and receive an induced capacitance (not shown in the drawings) in relation to each of the plurality of sensing nodes $N\_11\sim N\_99$ from the plurality of sensing lines $SA\_1\sim SA\_9$. It should be noted that the touch controller 22 can be a hardware circuit or a hardware circuit in combination with firmware and software; however, the present disclosure is not limited thereto. A person skilled in the art can design the touch controller 22 according to actual needs or applications.

Taking the sensing node $N\_88$ for example, the touch controller 22 transmits a driving signal to the driving line $DA\_8$ of the sensing node $N\_88$, and receives the induced capacitance of the sensing node $N\_88$ from the sensing line $SA\_8$. When the sensing node $N\_88$ is touched by an external object, e.g. the finger of a user, the capacitance value of the sensing node $N\_88$ changes accordingly. Therefore, the touch controller 22 can utilize the change in capacitance to determine whether the sensing node $N\_88$ has been touched. Since the above-mentioned technical detail is essentially the operational principle of a mutual capacitive touch sensor that is known to the art, further detail thereof will not be described herein.

It should be noted that the induced capacitance generated by the sensing nodes $N\_ij$ ($i=1\sim 9$; $j=1\sim 9$) when the sensing nodes $N\_ij$ is touched by an external object is proportional to $(\alpha Cm(N\_ij)/Cm(N\_ij))$, and due to manufacturing defects, the basic capacitance $Cm(N\_11)\sim Cm(N\_99)$ of each of the sensing nodes $N\_11\sim N\_99$ is different from one another. Each sensing node $N\_11\sim N\_99$ generates an induced capacitance according to their own basic capacitance $Cm(N\_11)\sim Cm(N\_99)$. Therefore, even if all the touch parameters are the same, the induced capacitances generated by each sensing node $N\_11\sim N\_99$ due to the touch from external objects are different from each other. Consequently, the difference in basic capacitance between sensing nodes $N\_11\sim N\_99$ leads to false determinations made by the touch controller 22 when the touch controller 22 tries to determine the touch positions.

Referring to FIG. 2, the steps of FIG. 1 will be described below. First, in step S101, the touch controller 22 obtains a capacitance variation $\Delta Cm(N\_11)\sim\Delta Cm(N\_99)$ in relation to each of the sensing nodes $N\_11\sim N\_99$ through at least one predetermined circuit (not shown in the drawings). Next, in step S103, the touch controller 22 further obtains a gain coefficient $gm(N\_11)\sim gm(N\_99)$ in relation to each of the sensing nodes $N\_11\sim N\_99$ according to the capacitance variation $\Delta Cm(N\_11)\sim\Delta Cm(N\_99)$ of each of the sensing nodes and the at least one predetermined circuit. Lastly, in step S105, the touch controller 22 compensates for the induced capacitance of each of the sensing nodes $N\_11\sim N\_99$ using the gain coefficient $gm(N\_ij)$ of the sensing node $N\_ij$ when the sensing node $N\_ij$ generates the induced capacitance in response to a touch from an external object.

It should be noted that the present disclosure is not limited by the way of compensating for the induced capacitance, which can be designed by a people skilled in the art according to actual needs or applications. In addition, the abovementioned "predetermined circuit" can be a known fake finger circuit; however, the present disclosure is not limited thereto. In other words, the spirit of the present disclosure is to use a fake finger circuit to simulate the situations when an external object, e.g. a finger of a user, touches each of the sensing nodes N_11~N_99 and induces the induced capacitance in each of the sensing nodes N_11~N_99. Therefore, it is better that the fake finger circuit be coupled between the driving lines DA_1~DA_9 and the sensing lines SA_~SA_9 of the sensing nodes N_11~N_99 respectively so that the touch controller 22 obtains the induced capacitance of each of the sensing nodes N_11~N_99 after the sensing nodes N_11~N_99 are coupled to the fake finger circuit.

Figure 3:
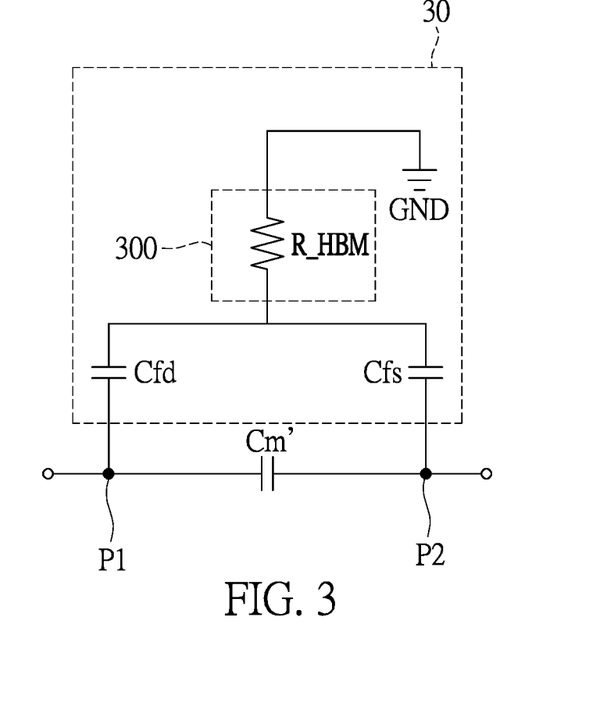
FIG. 3 is a schematic diagram illustrating a predetermined circuit of the touch panel of FIG. 2.

Next, the embodiment of the predetermined circuit will be described below. With reference to FIG. 3, which is a schematic diagram illustrating a predetermined circuit of the touch panel of FIG. 2, the components in FIG. 3 that are identical to the counterpart components in FIG. 2 will not be further explained. It is worth noting that the predetermined circuit can be the fake finger circuit 30 of FIG. 3; however, the present disclosure is not limited thereto. Moreover, in the present embodiment, the fake finger circuit 30 of FIG. 3 is coupled to the driving line DA_8 and the sensing line SA_8 of the sensing node N_88, i.e., the contact point P1 and the contact point P2 respectively represent where the fake finger circuit is coupled to the driving line DA_8 and to the sensing line SA_8; however, the present disclosure is not limited thereto.

Referring to FIG. 3, the fake finger circuit 30, i.e. the predetermined circuit, includes a first capacitor Cfd, a second capacitor Cfs and an electrical assembly 300. The first terminal of the first capacitor Cfd is coupled to the contact point P1, i.e. the driving line DA_8, and the first terminal of the second capacitor Cfs is coupled to the second terminal of the first capacitor Cfd. The second terminal of the second capacitor Cfs is coupled to the contact point P2, i.e. the sensing line SA_8. In practice, since the fake finger circuit 30 needs to be coupled to the driving lines DA_1~DA_9 and the sensing lines SA_1~SA_9 of each of the sensing nodes N_11~N_99 in a sequential order, the first terminal of the first capacitor Cfd is coupled to each of the driving lines DA_1~DA_9 in the sequential order and the second terminal of the second capacitor Cfs is coupled to each of the sensing lines SA_1~SA_9 in the sequential order. It is worth noting that the sequential order is a predetermined order and not necessarily the numerical order.

Moreover, the first terminal of the electrical assembly 300 is coupled between the second terminal of the first capacitor Cfd and the first terminal of the second capacitor Cfs, and the second terminal of the electrical assembly 300 is coupled to a ground voltage GND. However, since the fake finger circuit 30 serves as a substitute for a user's finger in the simulation, the electrical assembly 300 of the fake finger circuit 30 can be formed of at least one passive component. In one embodiment of the present disclosure, the electrical assembly 300 is a resistor R_HBM, as shown in FIG. 3. The resistor R_HBM is a 1.4 k ohms resistor in the present embodiment. In other embodiments, the electrical assembly 300 is an inductor (not shown in the drawings), or a resistor R_HBM in series connection with another capacitor (not shown in the drawings). In other words, the present disclosure is not limited to the above description, and the electrical assembly 300 can be designed according to actual needs and applications.

Accordingly, when the fake finger circuit 30 is coupled between the driving line DA_8, i.e. the contact point P1, and the sensing line SA_8, i.e. the contact point P2 of the sensing node N_88, the touch controller 22 transmits a driving signal to the driving line DA_8, and the sensing line SA_8 generates the induced capacitance Cm' of the sensing node N_88 as a result of being coupled to the fake finger circuit 30. Next, the touch controller 22 obtains the capacitance variation ΔCm(N_88) of the sensing node N_88 according to the ratio of the induced capacitance Cm' to the basic capacitance Cm (N_88), in which the basic capacitance Cm (N_88) is the capacitance of the sensing node N_88 before the sensing node N_88 is touched by an external object or the fake finger circuit 30.

For instance, the capacitance variation ΔCm(N_88) of the sensing node N_88 caused by the fake finger circuit 30 is the basic capacitance Cm (N_88) of the sensing node N_88 minus the induced capacitance Cm' of FIG. 3; however, the present disclosure is not limited thereto. That is to say, the way the touch controller 22 obtains the capacitance variation ΔCm(N_ij) of a sensing node N_ij is not limited in the present disclosure. A person skilled in the art can design other manners according to actual needs.

Figure 4:
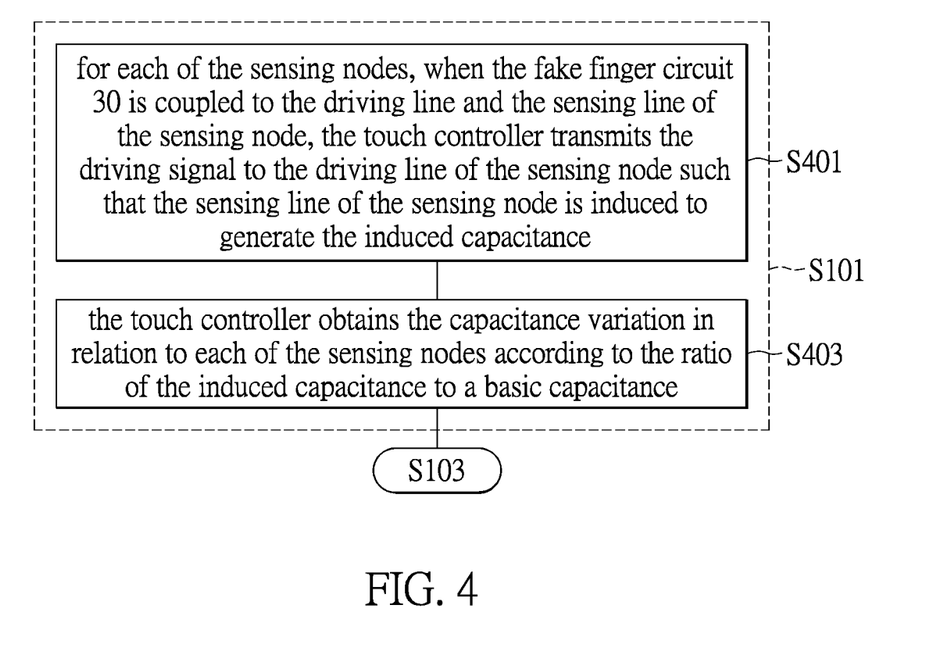
FIG. 4 is a flow chart illustrating the step of obtaining the capacitance variation in relation to each of the sensing nodes in the compensation method for an induced amount in a touch sensor shown in FIG. 1.

Furthermore, step S101 of FIG. 1 will be described with reference to FIG. 4. FIG. 4 is a flow chart illustrating the step of obtaining the capacitance variation in relation to each of the sensing nodes in the compensation method for an induced amount in a touch sensor shown in FIG. 1. In FIG. 4, the fake finger circuit 30 is taken as an example for the predetermined circuit of the present disclosure as well. Therefore, FIG. 2 and FIG. 3 are also referred to. In addition, the steps in FIG. 4 that are also illustrated in FIG. 1 will not be further described herein.

Specifically, step S101 of FIG. 4 further includes step S401 to step S403. In step S401, for each of the sensing nodes N_11~N_99, when the fake finger circuit 30 is coupled to the driving line DA_i and the sensing line SA_j of the sensing node N_ij, the touch controller 22 transmits the driving signal to the driving line DA_i of the sensing node N_ij such that the sensing line SA_j of the sensing node N_ij is induced to generate the induced capacitance Cm'.

Next, in step S403, the touch controller 22 obtains the capacitance variation ΔCm(N_11)~ΔCm(N_99) in relation to each of the sensing nodes N_11~N_99 according to the ratio of the induced capacitance Cm' (N_11)~Cm' (N_99) to a basic capacitance Cm(N_11)~Cm(N_99). Specifically, the induced capacitance Cm' (N_11)~Cm' (N_99) is generated as the result of the sensing node N_11~N_99 being coupled to the fake finger circuit 30, and the basic capacitance Cm(N_11)~Cm(N_99) exists in the sensing node N_11~N_99 before the sensing node N_11~N_99 is touched by an external object.

More specifically, with reference to FIG. 3, since the components of the fake finger circuit 30, i.e. the first capacitor Cfd, the second capacitor Cfs, and the resistor R_HBM, are components with known parameters, and the touch controller 22 obtains the capacitance variation ΔCm (N_88) on the sensing node N_88 caused by the fake finger circuit 30, the touch controller 22 can thus obtain the gain coefficient gm (N_88) of the sensing node N_88. It should be noted that, the abovementioned embodiment is only presented as an example, and is not deemed as limiting the scope of the present disclosure. In other words, the way the gain coefficient gm (N_ij) of the sensing node N_ij is obtained is not limited in the present disclosure. A person skilled in the art can design other manners according to actual needs.

More specifically, considering the fact that the induced capacitance of each of the sensing nodes N_11~N_99 differs in accordance with the basic capacitance Cm(N_11)~Cm(N_99) of each of the sensing nodes N_11~N_99, the spirit of the present disclosure is to acquire the capacitance variation ΔCm(N_11)~ΔCm(N_99) of each of the sensing nodes N_11~N_99, and further obtain the gain coefficient gm(N_11)~gm(N_99) of each of the sensing nodes N_11~N_99 so that when a sensing node N_ij is actually touched by an external object and generates an induced capacitance accordingly, the touch controller 22 compensates for the induced capacitance using the gain coefficient gm (N_ij) of the sensing node N_ij such that the negative effects caused by the basic capacitance Cm (N_ij) can be eliminated.

For example, if the gain coefficient gm (N_88) of the sensing node N_88 is 1.025, it means that the induced capacitance Cm' of the sensing node N_88 caused by the fake finger circuit 30 is 0.025 times larger than it should be. Therefore, when the sensing node N_88 is actually touched by an external object and generates an induced capacitance accordingly, the touch controller 22 of the present disclosure compensates for the induced capacitance using the gain coefficient gm (N_88) of the sensing node N_88 such that the extra gain of 0.025 times is eliminated.

Furthermore, the touch controller 22 of the present disclosure can determine if the touch sensor 20 is touched by an external object by determining if the induced capacitance of each of the sensing nodes N_11~N_99 is smaller than a threshold value. Therefore, taking into consideration that the value of the induced capacitance of each of the sensing nodes N_11~N_99 depends on the basic capacitance Cm(N_11)~Cm(N_99), the compensation method of the present disclosure can prevent the touch controller 22 from making false determinations using various technical solutions, for example, using a self-adaptive threshold value.

Figure 5:
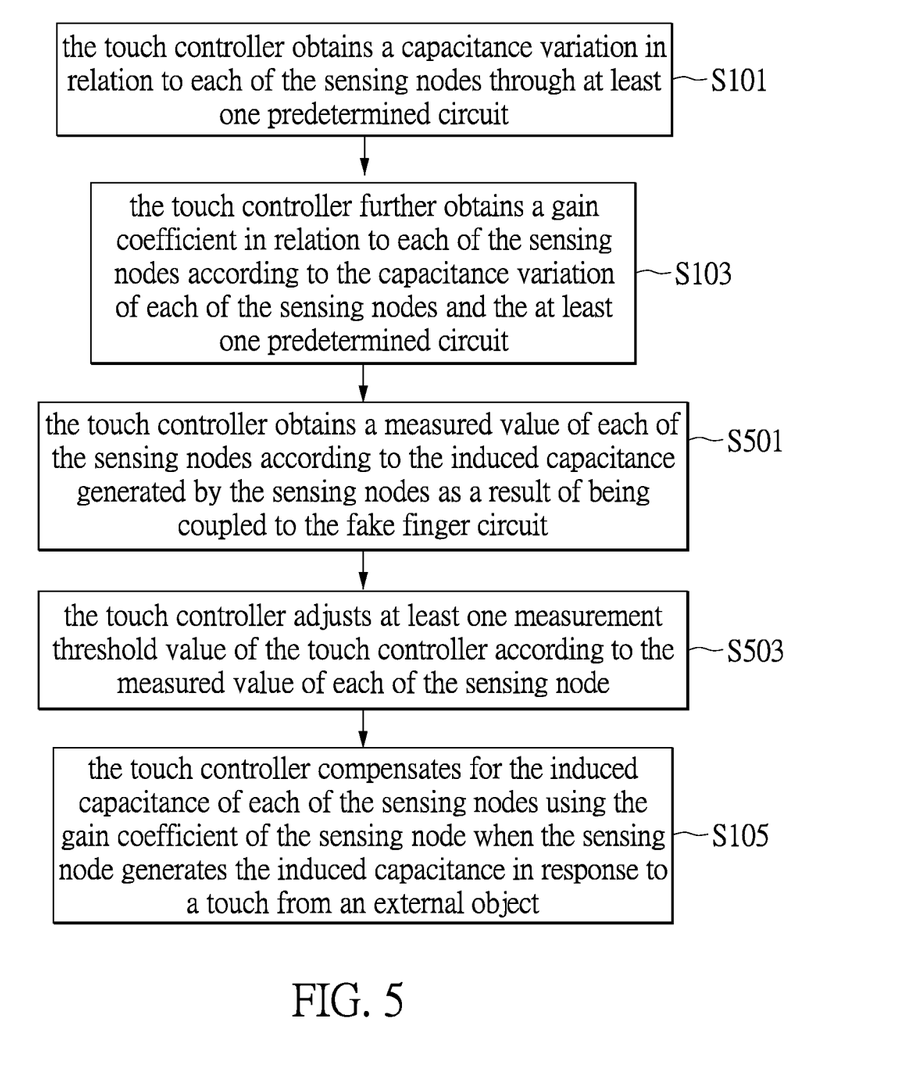
FIG. 5 is a flow chart illustrating a compensation method for an induced amount in a touch sensor according to another embodiment of the present disclosure.

With reference to FIG. 5, which is a flow chart illustrating a compensation method for an induced amount in a touch sensor according to another embodiment of the present disclosure, the compensation method of FIG. 5 can be performed on the touch controller 22 of FIG. 2 as well. In addition, the predetermined circuit is exemplified as the fake finger circuit 30 of FIG. 3, and thus FIG. 2 and FIG. 3 are also referred to. Moreover, FIG. 5 contains some steps that are also shown in FIG. 1, and a further description thereof will not be further described herein.

Specifically, compared with FIG. 1, FIG. 5 further includes step S501 to step S503. In step S501, the touch controller 22 obtains a measured value of each of the sensing nodes N_11~N_99 according to the induced capacitance Cm' (N_11)~Cm' (N_99) generated by the sensing nodes N_11 ~N_99 as a result of being coupled to the fake finger circuit 30, and in step S503, the touch controller 22 adjusts at least one measurement threshold value (not shown in the drawings) of the touch controller 22 according to the measured value of each of the sensing nodes N_11~N_99.

More specifically, the measurement threshold value is the aforementioned threshold value for determining if the touch sensor is touched. It should be noted that step S103 and steps S501 to S503 are independent of one another. That is to say, while performing step S103, the touch controller 22 can at the same time obtain a measured value of each of the sensing nodes N_11~N_99 according to the induced capacitance Cm' (N_11)~Cm' (N_99) generated by the sensing nodes N_11~N_99 as a result of being coupled to the fake finger circuit 30, and adjust the at least one measurement threshold value that is used for determining if the touch sensor is touched.

It should be noted that the way of determining if the induced capacitance of each of the sensing nodes N_11~N_99 falls below the measurement threshold value can be designed according to actual needs. Furthermore, the touch panel 2 of FIG. 2 further includes a memory unit (not shown in the drawings), which stores the measurement threshold value.

Figure 6:
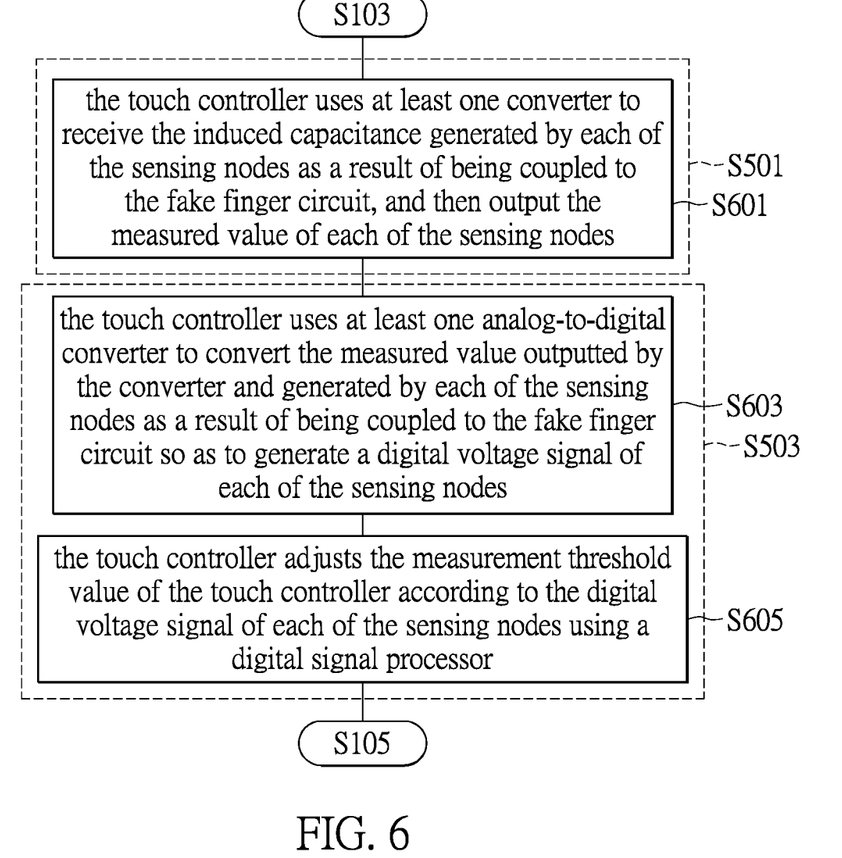
FIG. 6 is a flow chart illustrating the step of obtaining a measured value in relation to each of the sensing nodes and adjusting at least one measurement threshold value according to the measured value in the compensation method of FIG. 5.
Figure 7:
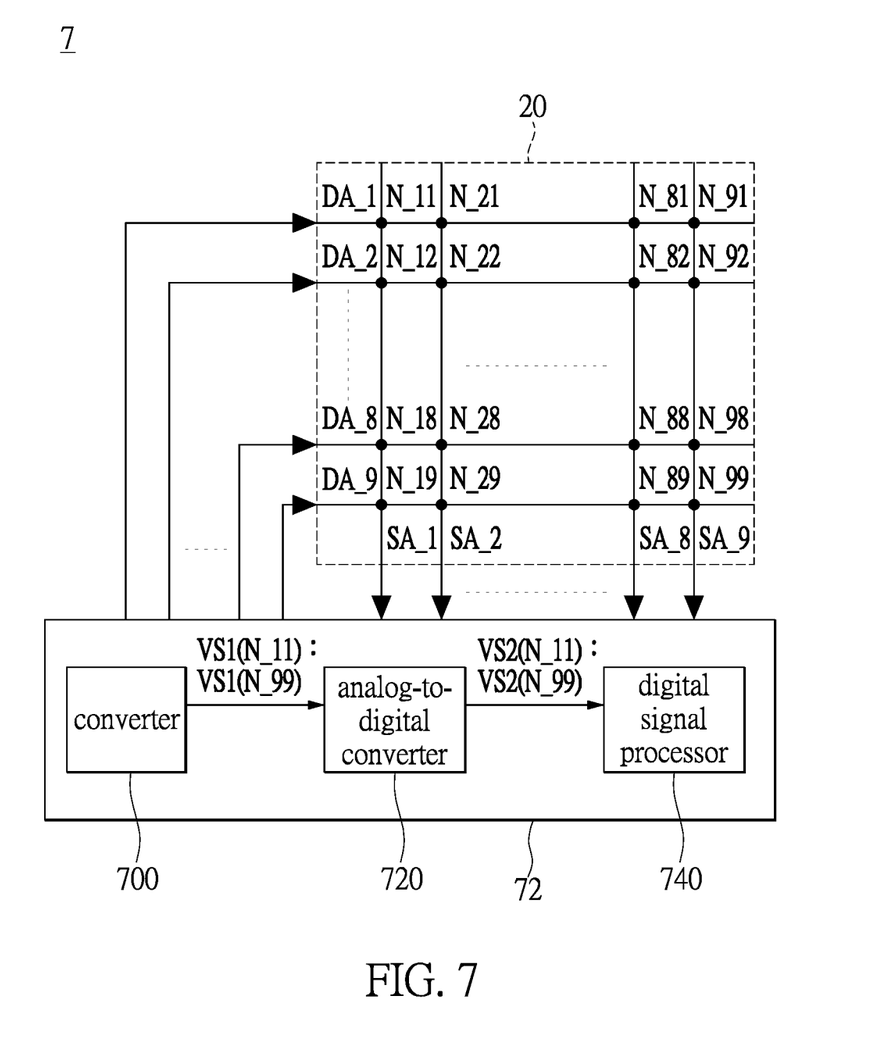
FIG. 7 is a functional block diagram of a touch panel according to another embodiment of the present disclosure.

To further describe the detail of steps S501 to S503, the present disclosure further provides an embodiment herein. With reference to FIGS. 6 and 7, in which FIG. 6 is a flow chart illustrating the step of obtaining a measured value in relation to each of the sensing nodes and adjusting at least one measurement threshold value according to the measured value in the compensation method of FIG. 5, and FIG. 7 is a functional block diagram of a touch panel according to the present embodiment, the compensation method of FIG. 6 can be performed on the touch controller 72 of FIG. 7; however, the present disclosure is not limited thereto. In addition, the touch panel 7 is only a way of implementing the compensation method of the present disclosure, and is not deemed as limiting the scope of the present disclosure.

It should be noted that FIG. 6 contains some steps that are also shown in FIG. 5, which will not be further described herein. Furthermore, the components in FIG. 7 that are identical to the counterpart components in FIG. 2 will not be further explained. Moreover, the touch panel 7 of FIG. 7 is exemplified as the fake finger circuit 30 of FIG. 3, and thus FIG. 3 is also referred to.

Specifically, compared with the touch controller 22 of FIG. 2, the touch controller 72 of FIG. 7 further includes at least one converter 700, at least one analog-to-digital converter 720, and a digital signal processor 740. In addition, step S501 and step S503 further include step S601 and steps S603 to S605 respectively. First, in step S601, the touch controller 72 uses at least one converter 700 to receive the induced capacitance Cm' (N_11)~Cm' (N_99) generated by each of the sensing nodes N_11~N_99 as a result of being coupled to the fake finger circuit 30, and then output the measured value VS1(N_11)~VS1(N_99) of each of the sensing nodes N_11~N_99. Next, in step S603, the touch controller 72 uses at least one analog-to-digital converter 720 to convert the measured value VS1(N_11)~VS1(N_99) outputted by the converter 700 and generated by each of the sensing nodes N_11~N_99 as a result of being coupled to the fake finger circuit 30 so as to generate a digital voltage signal VS2(N_11)~VS2(_99) of each of the sensing nodes N_11~N_99.

Next, in step S605, the touch controller 72 adjusts the measurement threshold value of the touch controller 72 according to the digital voltage signal VS2(N_11)~VS2(N_99) of each of the sensing nodes N_11~N_99 using a digital signal processor 740. In order to facilitate the description of the present disclosure, the number of the converter 700 and the number of the analog-to-digital converter 720 are both one; however, the present disclosure is not limited thereto. For example, in other embodiments, the touch controller 72 can include the same number of converters 700 and the same number of analog-to-digital converters 720 as the sensing lines SA_1~SA_9, in which each converter 700 is coupled between one of the sensing lines SA_j and one of the analog-to-digital converters 720. Accordingly, when the fake finger circuit 30 is coupled to a sensing node N_ij, the converter 700 corresponding to the sensing line SA_j of the sensing node N_ij outputs a measured value VS1(N_ij) generated by the sensing node N_ij as a result of being coupled to the fake finger circuit 30, after which the analogto-digital converter 720 converts the measured value VS1 (N_ij) and then outputs a digital voltage signal VS2(N_ij) of the sensing node N_ij.

In other embodiments, a switch can be used to enable a converter 700 to be coupled between a plurality of sensing lines SA_1~SA_9 and an analog-to-digital converter 720. In other words, the present disclosure is not limited to the above-described manner. A person skilled in the art can determine the number of the converter 700, the number of the analog-to-digital converter 720, and the connection method thereof according to actual needs. Furthermore, it should be understood that the converter 700 can be a capacitance-to-voltage converter; however, the present disclosure is not limited thereto. In order to further describe the detail of the converter 700, with reference to FIG. 8, the present disclosure provides another embodiment herein. Specifically, FIG. 8 is a schematic diagram illustrating the circuit of the converter inside the touch panel of FIG. 7.

It should be noted that, the following description concerning the structural manner of the capacitance-to-voltage converter is not a limitation but for illustrative purposes. In other words, the present disclosure is not limited by the structural aspect of the capacitance-to-voltage converter. In addition, in order to facilitate the description, the fake finger circuit 30 of the embodiment shown in FIG. 8 is, as the fake finger circuit 30 of previous embodiments does, coupled to the driving line DA_8 and the sensing line SA_8 of the sensing node N_88. Moreover, the components shown in FIG. 8 that are also shown in FIG. 3 have the same reference numerals, and will not be further described herein.

Figure 8:
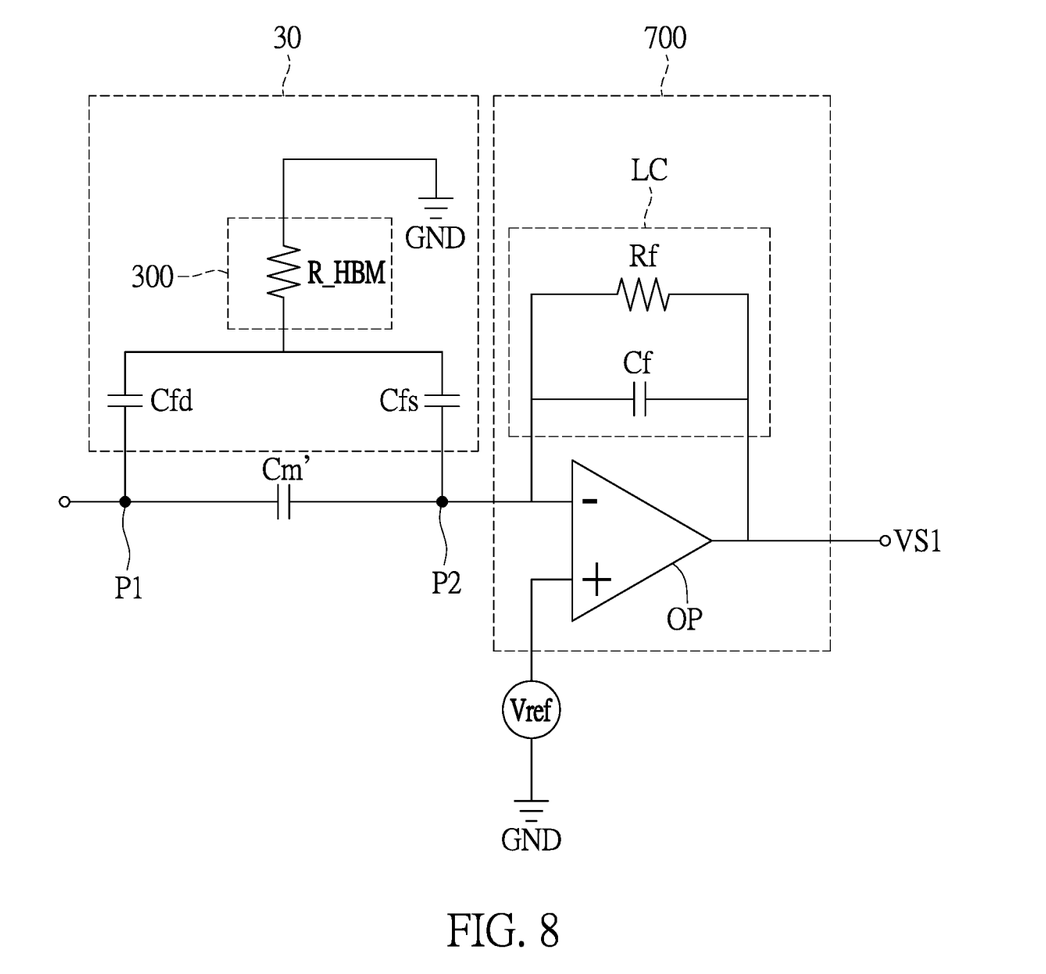
FIG. 8 is a schematic diagram illustrating the circuit of the converter inside the touch panel of FIG. 7.

With reference to FIG. 8, the converter 700 includes an operational amplifier OP and a negative feedback circuit LC. The inverting input terminal of the operational amplifier OP is coupled to the contact point P2, i.e. the sensing line SA_8, and the non-inverting input terminal of the operational amplifier OP is coupled to a reference voltage Vref. Furthermore, the output terminal of the operational amplifier OP outputs the measured value VS1(N_88) generated by the sensing node N_88 as a result of being coupled to the fake finger circuit 30. In addition, the negative feedback circuit LC is coupled between the inverting input terminal and the output terminal of the operational amplifier OP. The negative feedback circuit LC is formed of a third capacitor Cf and a resistor Rf in parallel connection with the third capacitor Cf.

It can be derived from the above that, when the sensing node N_ij generates an induced capacitance Cm'(N_ij) as a result of being coupled to the fake finger circuit 30, the inverting input terminal of the operational amplifier OP is coupled to the SA_j corresponding to the sensing node N_ij, and the output terminal of the operational amplifier OP outputs the measured value VS1(N_ij) generated by the sensing node N_ij as a result of being coupled to the fake finger circuit 30. Since the operational principle of capacitance-to-voltage converter is common knowledge in the art, a detailed description thereof will be omitted.

Since the digital signal processor 740 obtains the digital voltage signal VS2(N_11)~VS2(N_99) generated by the sensing nodes N_11~N_99 as a result of being coupled to the fake finger circuit 30, the digital signal processor 740 can design the measurement threshold value to be adjusted according to these digitized signal data. It should be noted that the present disclosure is not limited by the adjustment method for adjusting the measurement threshold value.

In summary, the compensation method for an induced amount in a touch sensor and the touch panel thereof use a fake finger circuit to simulate the situations when a user touches the sensing nodes, and obtain the gain coefficient of each of the sensing nodes so as to compensate for the induced capacitance generated by a sensing node as a result of being coupled to an external object according to the gain coefficient of the sensing node. In this way, the negative effects caused by extra gains due to the difference in basic capacitance between the sensing nodes are eliminated. Accordingly, false determinations of touch positions can be prevented.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A compensation method for an induced amount in a touch sensor performed on a touch controller, the touch sensor including a plurality of sensing lines arranged parallel to a first direction and a plurality of driving lines arranged parallel to a second direction, in which the plurality of the sensing lines intersect the plurality of driving lines to form a plurality of sensing nodes, and the touch controller is electrically connected to the plurality of sensing lines and the plurality of driving lines so as to transmit a driving signal to the plurality of driving lines and receive an induced capacitance in relation to each of the plurality of sensing nodes from the plurality of sensing lines, the compensation method for an induced amount comprising:

obtaining a capacitance variation in relation to each of the sensing nodes through at least one predetermined circuit;

obtaining a gain coefficient in relation to each of the sensing nodes according to the capacitance variation of each of the sensing nodes and the at least one predetermined circuit; and compensating for the induced capacitance of each of the sensing nodes using the gain coefficient of the sensing node when the sensing node generates the induced capacitance in response to a touch from an external object.

2. The compensation method for an induced amount according to claim 1, wherein the predetermined circuit is a fake finger circuit, which is coupled to the driving line and the sensing line of each of the sensing nodes in a sequential order so that the touch controller obtains the induced capacitance generated by each of the sensing nodes as a result of being coupled to the fake finger circuit.

3. The compensation method for an induced amount according to claim 2, wherein the fake finger circuit includes:

a first capacitor having a first terminal and a second terminal, the first terminal of the first capacitor being coupled to the plurality of driving lines in a sequential order;

a second capacitor having a first terminal and a second terminal, the first terminal of the second capacitor being coupled to the second terminal of the first capacitor, and the second terminal of the second capacitor being coupled to the plurality of sensing lines in a sequential order; and an electrical assembly, wherein a first terminal of the electrical assembly is coupled between the second terminal of the first capacitor and the first terminal of the second capacitor, and a second terminal of the electrical assembly is coupled to a ground voltage.

4. The compensation method for an induced amount according to claim 3, wherein the electrical assembly is formed of at least one passive component.

5. The compensation method for an induced amount according to claim 4, wherein the step of obtaining a capacitance variation in relation to each of the sensing nodes through at least one predetermined circuit further includes:
for each of the sensing nodes, when the fake finger circuit is coupled to the driving line and the sensing line of the sensing node, the touch controller transmits the driving signal to the driving line of the sensing node such that the sensing line of the sensing node is induced to generate the induced capacitance; and
obtaining the capacitance variation in relation to each of the sensing nodes according to the ratio of the induced capacitance to a basic capacitance, in which the induced capacitance is generated as the result of the sensing node being coupled to the fake finger circuit, and the basic capacitance exists in the sensing node before the sensing node is touched by an external object.

6. The compensation method for an induced amount according to claim 5, further comprising:
obtaining a measured value of each of the sensing nodes according to the induced capacitance generated by the sensing node as a result of being coupled to the fake finger circuit; and
adjusting at least one measurement threshold value of the touch controller according to the measured value of each of the sensing nodes, wherein the measurement threshold value is for determining if the touch sensor is touched.

7. The compensation method for an induced amount according to claim 6, wherein the step of obtaining a measured value of each of the sensing nodes according to the induced capacitance generated by the sensing node as a result of being coupled to the fake finger circuit further includes:
using at least one converter to receive the induced capacitance generated by each of the sensing nodes as a result of being coupled to the fake finger circuit, and then output the measured value of each of the sensing nodes.

8. The compensation method for an induced amount according to claim 7, wherein the step of adjusting at least one measurement threshold value of the touch controller according to the measured value of each of the sensing nodes further includes:
using at least one analog-to-digital converter (ADC) to convert the measured value generated by each of the sensing nodes as a result of being coupled to the fake finger circuit and outputted by the converter so as to generate a digital voltage signal of each of the sensing nodes; and
adjusting the measurement threshold value of the touch controller according to the digital voltage signal of each of the sensing nodes utilizing a digital signal processor (DSP).

9. The compensation method for an induced amount according to claim 7, wherein the converter is a capacitance-to-voltage converter including:
an operational amplifier having an inverting input terminal, a non-inverting input terminal, and an output terminal, the non-inverting input terminal of the operational amplifier being coupled to a reference voltage, wherein when one of the sensing nodes generates the induced capacitance as a result of being coupled to the fake finger module circuit, the inverting input terminal of the operational amplifier is coupled to the sensing line corresponding to the sensing node, and the output terminal of the operational amplifier outputs the measured value generated by the sensing nodes as a result of being coupled to the fake finger circuit; and
a negative feedback circuit coupled to the inverting input terminal and the output terminal of the operational amplifier, wherein the negative feedback circuit is formed of a third capacitance and a resistance connected in parallel to the third capacitance.

10. A touch panel, comprising:
a touch sensor including a plurality of sensing lines arranged parallel to a first direction and a plurality of driving lines arranged parallel to a second direction, in which the plurality of the sensing lines intersect the plurality of driving lines to form a plurality of sensing nodes; and
a touch controller electrically connected to the plurality of sensing lines and the plurality of driving lines so as to transmit a driving signal to the plurality of driving lines and receive an induced capacitance in relation to each of the plurality of sensing nodes from the plurality of sensing lines,
wherein the touch controller obtains a capacitance variation in relation to each of the sensing nodes through at least one predetermined circuit, and a gain coefficient in relation to each of the sensing nodes according to the capacitance variation of each of the sensing nodes and the at least one predetermined circuit; and
compensating for the induced capacitance of each of the sensing nodes using the gain coefficient of the sensing node when the sensing node generates the induced capacitance in response to a touch from an external object.

11. The touch panel according to claim 10, wherein the predetermined circuit is a fake finger circuit, which is coupled to the driving line and the sensing line of each of the sensing nodes in a sequential order so that the touch controller obtains the induced capacitance generated by each of the sensing nodes as a result of being coupled to the fake finger circuit.

12. The touch panel according to claim 11, wherein the fake finger circuit includes:
a first capacitor having a first terminal and a second terminal, the first terminal of the first capacitor being coupled to the plurality of driving lines in a sequential order;
a second capacitor having a first terminal and a second terminal, the first terminal of the second capacitor being coupled to the second terminal of the first capacitor, and the second terminal of the second capacitor being coupled to the plurality of sensing lines in a sequential order; and
an electrical assembly, wherein a first terminal is coupled between the second terminal of the first capacitor and the first terminal of the second capacitor, and a second terminal of the electrical assembly is coupled to a ground voltage.

13. The touch panel according to claim 12, wherein the electrical assembly is formed of at least one passive component.

14. The touch panel according to claim 13, wherein the touch controller performs the following steps so as to obtain the capacitance variation in relation to each of the sensing nodes:
for each of the sensing nodes, when the fake finger circuit is coupled to the driving line and the sensing line of the sensing node, the touch controller transmits the driving signal to the driving line of the sensing node such that the sensing line of the sensing node is induced to generate the induced capacitance; and obtaining the capacitance variation in relation to each of the sensing nodes according to the ratio of the induced capacitance to a basic capacitance, in which the induced capacitance is generated as the result of the sensing node being coupled to the fake finger circuit, and the basic capacitance exists in the sensing node before the sensing node is touched by an external object.

15. The touch panel according to claim 14, wherein the touch controller obtains a measured value of each of the sensing nodes according to the induced capacitance generated by the sensing nodes as a result of being coupled to the fake finger circuit, and adjusts at least one measurement threshold value of the touch controller according to the measured value of each of the sensing nodes, wherein the measurement threshold value is for determining if the touch sensor is touched.

16. The touch panel according to claim 15, wherein the touch controller performs the following step so as to obtain the measured value of each of the sensing nodes according to the induced capacitance generated by the sensing node as a result of being coupled to the fake finger circuit:

using at least one converter to receive the induced capacitance generated by each of the sensing nodes as a result of being coupled to the fake finger circuit, and then output the measured value of each of the sensing nodes.

17. The touch panel according to claim 16, wherein the touch controller performs the following steps so as to adjust at least one measurement threshold value of the touch controller according to the measured value of each of the sensing nodes:

using at least one analog-to-digital converter (ADC) to convert the measured value outputted by the converter and generated by each of the sensing nodes as a result of being coupled to the fake finger circuit so as to generate a digital voltage signal of each of the sensing nodes; and adjusting the measurement threshold value of the touch controller according to the digital voltage signal of each of the sensing nodes using a digital signal processor.

18. The touch panel according to claim 16, wherein the converter is a capacitor-to-voltage converter including:

an operational amplifier having an inverting input terminal, a non-inverting input terminal, and an output terminal, the non-inverting input terminal of the operational amplifier being coupled to a reference voltage, wherein when one of the sensing nodes generates the induced capacitance as a result of being coupled to the fake finger module circuit, the inverting input terminal of the operational amplifier is coupled to the sensing line corresponding to the sensing node, and the output terminal of the operational amplifier outputs the measured value generated by the sensing nodes as a result of being coupled to the fake finger circuit; and a negative feedback circuit coupled to the inverting input terminal and the output terminal of the operational amplifier, wherein the negative feedback circuit is formed of a third capacitance and a resistance connected in parallel to the third capacitance.

\* \* \* \* \*